(12) United States Patent
Wolf

(10) Patent No.: US 7,151,369 B1
(45) Date of Patent: Dec. 19, 2006

(54) POSITION SENSOR

(76) Inventor: Ronald J. Wolf, 51082 Stratford Ct., Elkhart, IN (US) 46511

( * ) Notice: Subject to any disclaimer, the term of this patent is extended or adjusted under 35 U.S.C. 154(b) by 0 days.

(21) Appl. No.: 11/224,169

(22) Filed: Sep. 12, 2005

(51) Int. Cl.
*G01B 7/30* (2006.01)

(52) U.S. Cl. .............................. 324/207.24; 324/207.25

(58) Field of Classification Search .................... None
See application file for complete search history.

(56) References Cited

U.S. PATENT DOCUMENTS

| | | | |
|---|---|---|---|
| 4,810,965 A | 3/1989 | Fujiwara et al. | |
| 4,970,463 A | 11/1990 | Wolf et al. | |
| 5,045,785 A | 9/1991 | Hansen | |
| 5,111,092 A | 5/1992 | Reimicke | |
| 6,753,680 B1 | 6/2004 | Wolf | |
| 2003/0112006 A1* | 6/2003 | Luetzow | 324/207.21 |
| 2003/0122641 A1* | 7/2003 | Luetzow | 335/205 |

* cited by examiner

*Primary Examiner*—Bot LeDynh

(57) ABSTRACT

A position sensor for sensing linear or radial position including at least two magnetic conductive structures, at least two magnets and a magnetic flux responsive device. The at least two magnetic conductive structures, include a first magnetic conductive structure and a second magnetic conductive structure. The first magnetic conductive structure being substantially parallel with the second magnetic conductive structure. The at least two magnets, including a first magnet and a second magnet. The first magnet being in contact with the first magnetic conductive structure and with the second magnetic conductive structure. The second magnet being in contact with both the first magnetic conductive structure and the second magnetic conductive structure. The magnetic flux responsive device constrained to travel a path that is partially located between the first magnetic conductive structure and the second magnetic conductive structure, with the path extending beyond at least one of the at least two magnets.

20 Claims, 3 Drawing Sheets

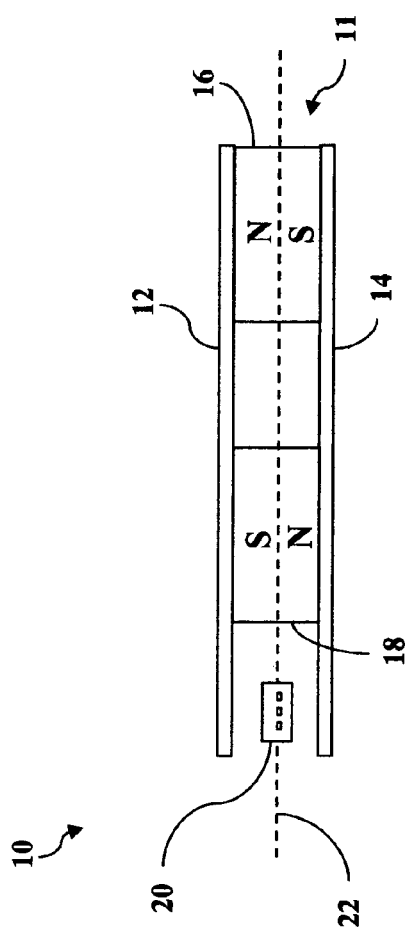
Fig. #1
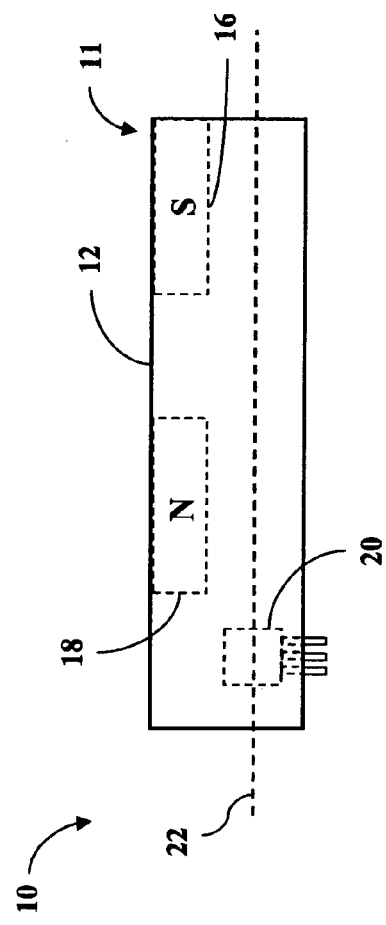
Fig. #2

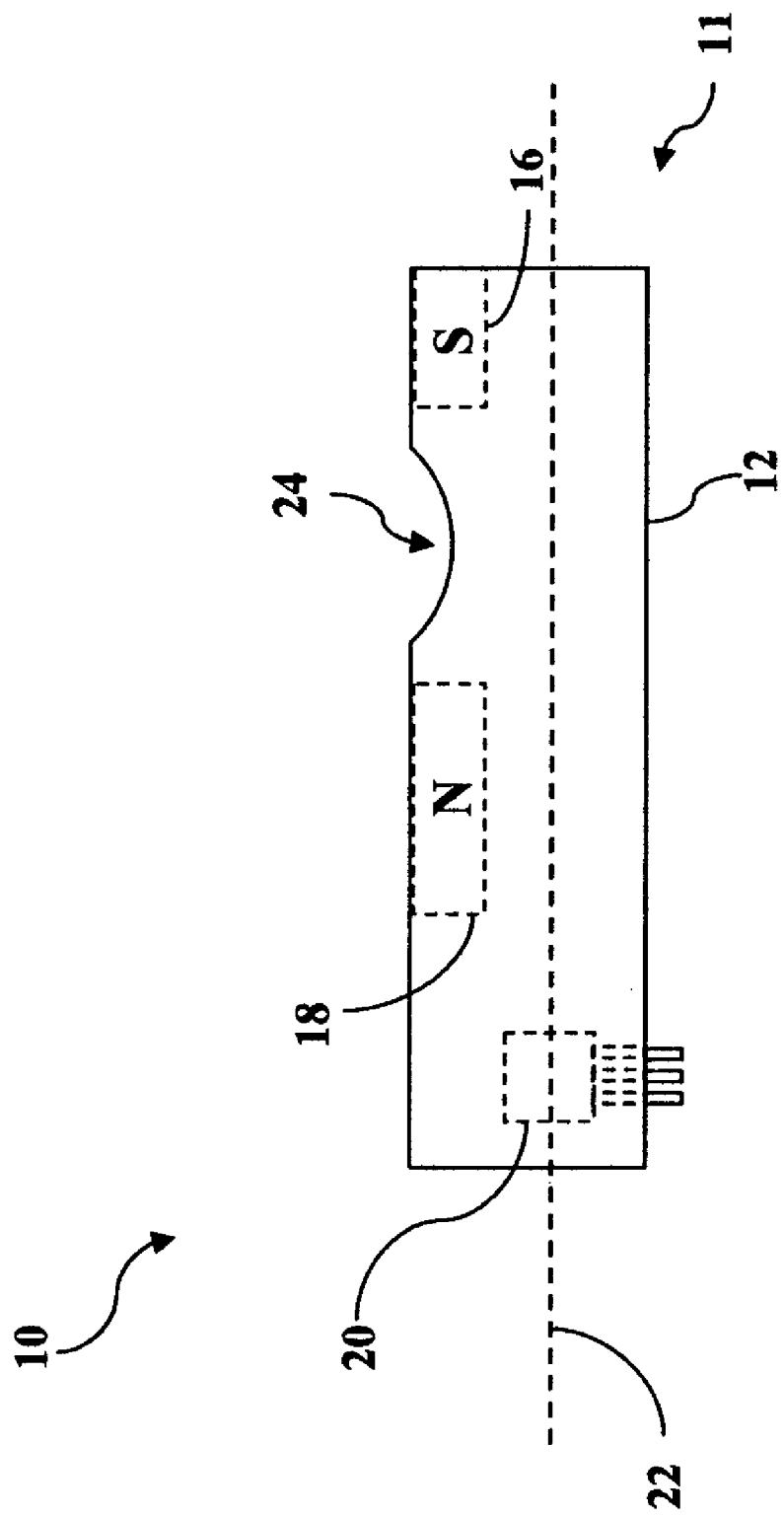
Fig. #3

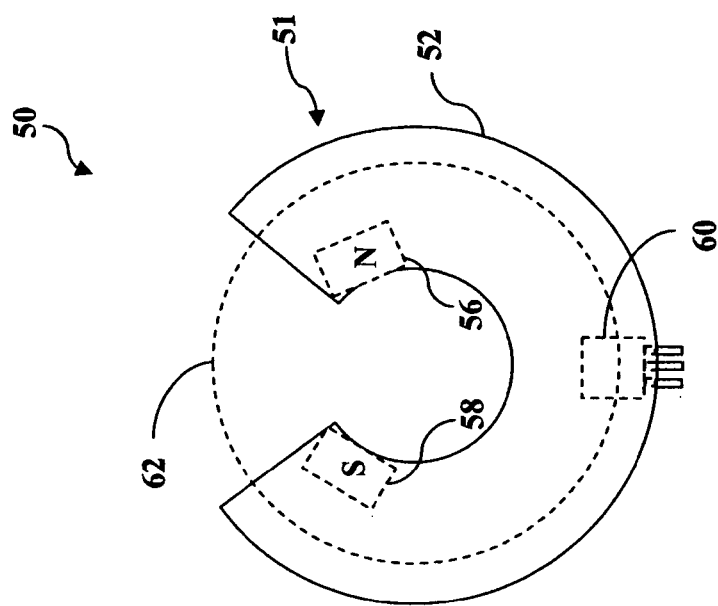
Fig. #4
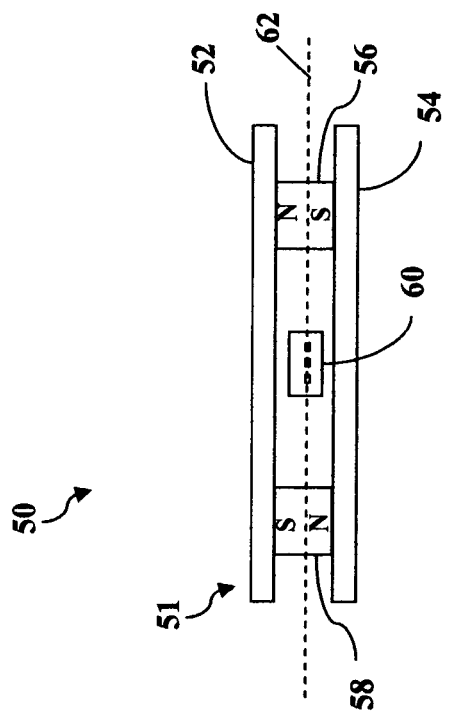
Fig. #5

POSITION SENSOR

BACKGROUND OF THE INVENTION

1. Field of the Invention

The present invention relates to electromagnetic sensor assemblies, and, more particularly, to electromagnetic position sensors.

2. Description of the Related Art

Electronic devices are an increasing part of everyday life and they are presently integrated in a large number of products, including products traditionally thought of as mechanical in nature, such as automobiles. To bridge the gap between mechanical movement and electronic control, it is necessary to successfully integrate electronic and mechanical components. This gap is normally bridged by using devices such as sensors and actuators.

Position sensors are used to electronically monitor the position or movement of a mechanical component. The position sensor produces data that may be expressed as an electrical signal that varies as the position or angular displacement of the mechanical component as it changes. Position sensors are an important part of innumerable products, providing the opportunity for intelligent control of mechanical devices.

Various contact-type sensors are known. For example, potentiometers are used to detect a change in electrical signal due to the physical change in position of a wiping contact on a resistive element. Rotational position and movement can be detected by coupling a shaft of a potentiometer to the shaft of a rotating mechanical component. Linear movement can be detected using either a linear potentiometer or a rotating potentiometer that is coupled to a linear-moving component using pulleys and a string or a belt to translate a linear motion to rotational motion. A problem with this type of sensor is the physical wearing of the rotating parts, the wiping contact, and the resistive element cause a drift in the electrical signal and lead to ultimate failure of the device.

Magnetic position sensors are generally a non-contact type of sensor and consist of a magnetic field sensing device, which is usually stationary, and a magnet is attached to a moving component. As the magnet approaches the sensing device, the magnetic field of the magnet is detected and the sensing device generates an electrical signal that is then used for counting, display purposes, recording and/or control purposes. A problem with such sensors is that they depend on a movement of the magnet, and they are not able to provide information as to the static position of a mechanical component.

Other magnetic position sensors provide an indication of the displacement of the mechanical component by using a magnetic field sensing device, which reports the intensity of a magnetic field from a magnet, which is positioned on a mechanical component. The magnet is positioned and the magnetic field sensing device is located relative to the magnet in such a fashion as to cause the magnetic field to vary in the magnetic field sensing device as the magnet moves. A magnetic field sensing device may detect a static magnetic field from a magnet and report the field strength as a representation of the position of the mechanical component.

A magnetic positional sensor developed by the inventor, patented as U.S. Pat. No. 5,818,223, entitled "Rotary Position Sensor with Circular Magnet," discloses a Hall effect device disposed within a cylindrical-shaped magnet, the magnet having a magnetic field that varies from a north pole to a south pole as detected along a circular face of the magnet. The cylindrical magnet is mounted on a rotatable mechanical component and the Hall effect device is positioned inside the cylindrical magnet with an air gap therearound. The Hall effect device has flux concentrators mounted thereto. The magnetic field produced by the cylindrical magnet is detected by the Hall effect device, which in response thereto produces an electrical response representative of the magnet's position, and hence, the mechanical component's angular position.

Another invention of the applicant includes a dual-rail system with magnets located at each end, the rails providing a varying magnetic field therebetween from one end of the rails to the other based upon the magnets associated with each end of each rail.

A problem with such sensors is they often require large magnets.

If the travel of the magnetic flux sensing device is not restrained in some manner, the sensing device may inappropriately come into contact with a magnet or some other structural portion of the sensor.

What is needed in the art is a position sensor, which will provide static and moving positional information without encountering a physical limitation of movement by way of the sensor embodiment.

SUMMARY OF THE INVENTION

This invention relates to a position sensor, which senses the linear or radial position of a mechanical assembly.

The invention, in one embodiment, consists of a position sensor for sensing linear or radial position including at least two magnetic conductive structures, at least two magnets and a magnetic flux responsive device. The at least two magnetic conductive structures, include a first magnetic conductive structure and a second magnetic conductive structure. The first magnetic conductive structure being substantially parallel with the second magnetic conductive structure. The at least two magnets, including a first magnet and a second magnet. The first magnet being in contact with the first magnetic conductive structure and with the second magnetic conductive structure. The second magnet being in contact with both the first magnetic conductive structure and the second magnetic conductive structure. The magnetic flux responsive device constrained to travel a path that is partially located between the first magnetic conductive structure and the second magnetic conductive structure, with the path extending beyond at least one of the at least two magnets.

An advantage of the present invention is that the magnetic flux responsive device may travel beyond a portion of the device that has a varying magnetic field, thereby resulting in a static output for at least a portion of the magnetic flux sensing device's travel.

Another advantage of the present invention is that the magnetic flux sensing device may travel beyond the useful sensing range and yet not be damaged by the physical movement. This advantageously allows for use of the sensor in mechanical devices, which may go beyond limits or may break and travel beyond an intended position. If such damage does occur, the sensing usefulness of the invention is not likewise destroyed and may allow continued use of the equipment in spite of the physical damage and/or at least allow the sensing system to control the device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 illustrates a side-view of a linear sensor of one embodiment of the present invention;

FIG. 2 illustrates another view of the linear sensor of FIG. 1;

FIG. 3 illustrates another embodiment of the linear sensor of FIGS. 1–2;

FIG. 4 illustrates a rotational sensor of another embodiment of the present invention; and FIG. 5 illustrates a schematized cross-sectional view of the sensor of FIG. 4.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE PRESENT INVENTION

Referring now to the drawings, and more particularly to FIGS. 1–2, there is shown a position sensor 10 including two magnetic conductive structures 12 and 14, also known as low carbon ferrous plates or rails 12 and 14, a first magnet 16, a second magnet 18, and a magnetic flux responsive device 20. For purposes of clarity, a mechanical structure holding magnetic flux responsive device is not shown, so as to better illustrate the functioning of the invention. Magnetic flux responsive device 20 travels along a path 22, which can extend beyond the ends of magnetic field generation device 11.

The magnetic polarities of first magnet 16 and second magnet 18 are opposite relative to first and second rails 12 and 14, as illustrated in FIG. 1. Along path 22, between first magnet 16 and second magnet 18, is a variable magnetic field that provides information to magnetic flux responsive device 20 for the purposes of determining the relative position of magnetic flux responsive device 20 relative to magnetic field device 11. As magnetic flux responsive device reaches the position as illustrated in FIG. 1, the magnetic field encountered in this portion of magnetic field device 11 is substantially static, resulting in an unchanging or pegged output, thereby indicating to a connected control unit, not shown, that the position of magnetic flux responsive device is beyond its intended range.

First magnet 16 and second magnet 18 are positioned along a side of rails 12 and 14 to thereby allow an unobstructed path 22 to exist so that magnetic flux responsive device 20 may travel therebetween and beyond without encountering any obstacles. The output of magnetic flux responsive device 20 is associated with its position as it travels between first magnet 16 and second magnet 18. Magnets 16 and 18 may be positioned between rails 12 and 14 or, in an alternative embodiment, may be inset into notches provided in rails 12 and 14 to accommodate the shape of magnets 16 and 18.

Now, additionally referring to FIG. 3, there is shown a sensor 10 that includes a notch 24 of material having been removed from rails 12 and 14. The notching of at least one rail 12 or 14 can be utilized to redirect the magnetic field that exists between first rail 12 and second rail 14. Such notching or shaping can also be used to modify the output profile that is to be detected by magnetic flux responsive device 20 as it traverses path 22. Alternatively, material may be added to other portions of rails 12 and 14 to also alter the magnetic field that is encountered along path 22. Magnet 18 is shown to be larger than magnet 16, in FIG. 3, to denote that magnet 18 has a larger magnetic strength than magnet 16, even though the physical size may not vary proportionately with the magnetic field strength.

Now, additionally referring to FIGS. 4–5, there is shown a rotational embodiment of the present invention in the form of a sensor 50 including a magnetic field structure 51 having a first rail 52, a second rail 54, a first magnet 56, and a second magnet 58. A first magnetic flux responsive device 60 travels along a path 62 between rails 52 and 54. At least a portion of path 62 is beyond magnetic field device 51. Another magnetic flux responsive device may be positioned to travel along path 62. Although magnetic flux responsive device 60 is shown radially-oriented from axis A, any angular displacement between the two is also contemplated. As in the previous embodiment, the mechanical structure that holds and directs magnetic flux responsive device 60 is purposely not shown for the sake of clarity. The travel of magnetic flux responsive device 60 is rotational in nature, relative to magnetic field generation device 51 around axis A. Either or both may rotate relative to each other, depending upon the physical configuration of the design.

Similar to the previous embodiment, magnetic flux responsive device 60 detects a variable magnetic field depending upon its particular position along path 58 as it travels between rails 52 and 54. This sensed magnetic position translates to an electrical signal that is detected by a control unit and translated into an angular position. As magnetic flux responsive device 60 rotates around axis A, magnetic flux responsive device 60 may become proximate to or immediately adjacent to another magnet, not shown that provides a stepped output, which may be simply a voltage shifted output. This provides information to the control unit, such as a present/not present, on/off or a 1/0 type output. This can be interpreted by a control system to stop a movement or to disregard measurements from magnetic flux responsive device 60 over a portion of path 62.

Alternatively, an additional rail system may cover the portion of path 62 that extends beyond magnetic structure 51 so that a controller can utilize information from first magnetic flux responsive device 60 over a portion of the rotational movement of the sensor 50 and another magnetic flux responsive device, over another portion of the angular displacement of sensor 50.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A position sensor for sensing linear or radial position, comprising:
 at least two magnetic conductive structures, including a first magnetic conductive structure and a second magnetic conductive structure, said first magnetic conductive structure being substantially parallel with said second magnetic conductive structure;
 at least two magnets, including a first magnet and a second magnet, said first magnet in contact with said first magnetic conductive structure and with said second magnetic conductive structure, said second magnet in contact with both said first magnetic conductive structure and said second magnetic conductive structure; and
 a magnetic flux responsive device constrained to travel a path that is partially located between said first magnetic conductive structure and said second magnetic conductive structure, said path extending beyond at least one of said at least two magnets.

2. The position sensor of claim 1, wherein said at least two magnetic conductive structures are each plates with shaped cutouts to accommodate said at least two magnets.

3. The position sensor of claim 1, wherein said at least two magnetic conductive structures are each ferrous plates.

4. The position sensor of claim 3, wherein at least one of said ferrous plates have a notch removed therefrom between said first magnet and said second magnet, thereby altering the magnetic conductivity of said ferrous plates.

5. The position sensor of claim 4, wherein at least one of said magnets are proximate an end of said ferrous plates.

6. The position sensor of claim 4, wherein said magnets are proximate a lateral edge of said ferrous plates.

7. The position sensor of claim 1, wherein said magnetic conductive structures have a first end and a second end, said first magnet being proximate to said first end, said second magnet being apart from said first end and said second end.

8. The position sensor of claim 7, wherein said at least two magnetic conductive structures are each ferrous plates.

9. The position sensor of claim 8, wherein at least one of said ferrous plates have a notch removed therefrom between said first magnet and said second magnet, thereby altering the magnetic conductivity of said ferrous plates between said first magnet and said second magnet.

10. The position sensor of claim 9, wherein said second magnet has a stronger magnetic field than said first magnet.

11. The position sensor of claim 10, wherein a portion of said path between said second magnet and said second end has a substantially constant magnetic field.

12. A method of detecting one of a linear and rotational position, comprising the steps of:
 coupling a north magnetic pole of a first magnet to a first ferrous plate and a south pole of said first magnet to a second ferrous plate;
 coupling a north magnetic pole of a second magnet to said second ferrous plate and a south pole of said second magnet to a first ferrous plate; and
 positioning a magnetic flux responsive device on a path that is at least partially between said first ferrous plate and said second ferrous plate, said path extending beyond at least one of said first magnet and said second magnet.

13. The method of claim 12, wherein said first ferrous plate and said second ferrous plate each have shaped cutouts to accommodate said first magnet and said second magnet.

14. The method of claim 12, wherein at least one of said first ferrous plate and said second ferrous plate have a notch removed therefrom between said first magnet and said second magnet, thereby altering a magnetic field between said first ferrous plate and said second ferrous plate.

15. The method of claim 12, wherein at least one of said first magnet and said second magnet are proximate an end of said ferrous plates.

16. The method of claim 15, wherein said magnets are proximate a lateral edge of said ferrous plates.

17. The method of claim 12, wherein said ferrous plates each have a first end and a second end, said first magnet being proximate to said first end of both said first ferrous plate and said second ferrous plate, said second magnet being apart from said first end and said second end.

18. The method of claim 17, wherein at least one of said ferrous plates have a notch removed therefrom between said first magnet and said second magnet, thereby altering the magnetic conductivity of said ferrous plates between said first magnet and said second magnet.

19. The method of claim 18, wherein said second magnet has a stronger magnetic field than said first magnet.

20. The method of claim 18, wherein a portion of said path between said second magnet and said second end has a substantially constant magnetic field.

* * * * *